(12) United States Patent
Voutour et al.

(10) Patent No.: US 8,799,809 B1
(45) Date of Patent: Aug. 5, 2014

(54) SYSTEMS AND METHODS FOR KEY LOGGER PREVENTION SECURITY TECHNIQUES

(75) Inventors: Teddy Joseph Edmond Voutour, Helotes, TX (US); Michael Frank Morris, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 936 days.

(21) Appl. No.: 12/237,874

(22) Filed: Sep. 25, 2008

Related U.S. Application Data

(62) Division of application No. 12/132,693, filed on Jun. 4, 2008, now abandoned.

(51) Int. Cl.
*G06F 3/048* (2013.01)
*G06F 3/06* (2006.01)

(52) U.S. Cl.
CPC .............. *G06F 3/0638* (2013.01); *G06F 3/048* (2013.01)
USPC .......................................... 715/780; 715/741

(58) Field of Classification Search
CPC ................................ G06F 3/0638; G06F 3/048
USPC ......... 715/780, 748, 749, 760, 763, 740–743, 715/745–747; 719/315
See application file for complete search history.

(56) References Cited

U.S. PATENT DOCUMENTS

| | | | |
|---|---|---|---|
| 7,797,752 B1 | 9/2010 | Vaidya et al. | |
| 2002/0140742 A1* | 10/2002 | Lection et al. | 345/835 |
| 2003/0220823 A1* | 11/2003 | Sartorius et al. | 705/8 |
| 2004/0158869 A1* | 8/2004 | Safran et al. | 725/105 |
| 2005/0008994 A1* | 1/2005 | Bisogno | 434/127 |
| 2005/0266385 A1* | 12/2005 | Bisogno | 434/127 |
| 2006/0101128 A1 | 5/2006 | Waterson | |
| 2006/0129599 A1* | 6/2006 | Hammerich | 707/104.1 |
| 2006/0190720 A1 | 8/2006 | Ozaki et al. | |
| 2007/0067833 A1* | 3/2007 | Colnot | 726/9 |
| 2007/0143593 A1* | 6/2007 | Cardoso | 713/150 |
| 2007/0220594 A1* | 9/2007 | Tulsyan | 726/5 |
| 2007/0240212 A1* | 10/2007 | Matalytski | 726/22 |

(Continued)

FOREIGN PATENT DOCUMENTS

| | | |
|---|---|---|
| WO | 2007/006072 A1 | 1/2007 |
| WO | 2007/070014 A1 | 6/2007 |

OTHER PUBLICATIONS

Szydlowski, Martin et al. "Secure Input for Web Applications". In Computer Security Applications Conference, 2007. ACSAC 2007. Twenty-Third Annual, Dec. 10-14, 2007, p. 375-384.

*Primary Examiner* — Steven Sax
(74) *Attorney, Agent, or Firm* — Kane Kessler, P.C.; Barry E. Negrin

(57) ABSTRACT

An applet may be downloaded or provided to a web browser when a user visits a site in order to protect data input by the user from being captured by malicious software, such as key loggers. The applet may present a user input field in the web browser and may generate a random sequence of low-level key stroke or mouse click events within the input field when the user enters information, such as a username and/or password. A listening key logger will receive a large amount of random data, whereas the applet will receive and buffer the actual user data that may be communicated to a remote site access by the user.

15 Claims, 6 Drawing Sheets

(56) References Cited

U.S. PATENT DOCUMENTS

| | | |
|---|---|---|
| 2007/0250920 A1 | 10/2007 | Lindsay |
| 2008/0109747 A1* | 5/2008 | Cao et al. .................. 715/780 |
| 2008/0244430 A1* | 10/2008 | Shortell et al. ............ 715/764 |
| 2008/0257956 A1* | 10/2008 | Grannan et al. ........... 235/380 |
| 2009/0125920 A1* | 5/2009 | Leff et al. .................. 719/330 |
| 2009/0254572 A1* | 10/2009 | Redlich et al. ............. 707/10 |
| 2009/0254998 A1* | 10/2009 | Wilson ....................... 726/27 |
| 2009/0300368 A1 | 12/2009 | Zilberstein et al. |
| 2010/0023750 A1* | 1/2010 | Tan .............................. 713/150 |
| 2011/0184847 A1* | 7/2011 | Axilrod et al. .............. 705/37 |

* cited by examiner

SYSTEMS AND METHODS FOR KEY LOGGER PREVENTION SECURITY TECHNIQUES

CROSS-REFERENCE TO RELATED SUBJECT MATTER

The present application is a divisional patent application of U.S. patent application Ser. No. 12/132,693 filed Jun. 4, 2008, the entirety of which is hereby incorporated by reference herein. Further, this application is related by subject matter to that disclosed in the following commonly assigned application, the entirety of which is hereby incorporated by reference herein: U.S. patent application Ser. No. 12/237,887, filed concurrently herewith and entitled "SYSTEMS AND METHODS FOR KEY LOGGER PREVENTION SECURITY TECHNIQUES".

BACKGROUND

Identity theft and fraud pose threats to information security in today's electronic age. Having one's identity stolen or credit destroyed can be a traumatic event and take years of phone calls and paperwork to reestablish one's credit. In addition, financial institutions suffer losses because of the fraud committed by those who steal innocent victims' identities. Generally, in order to protect personal information, a user sets a password known only to her, so that access to a system and to her personal information is only accepted when the preset password is correctly input.

However, malware such as key loggers may be implemented in hardware or software to log user keystrokes and/or mouse clicks for later retrieval. Key loggers are dangerous because they can be installed remotely without the knowledge of the user of a computing device. At some future time, the person who installed the key logger may retrieve information captured by the key logger and download the key strokes and/or mouse clicks. From this information, usernames and passwords may be determined for websites accessed by those who have used the keyboard and/or mouse.

Efforts to defeat key loggers include the use of one-time passwords, biometric devices, and rotating "secret" information (e.g., high school attended, favorite color, etc.) that is entered by a user. However, these mechanisms require the user to enter information that is known about the user, thus the key logger is still effective at gathering useful information about the user. Other mechanisms, such as graphically entered information through number pads, etc. that are displayed on a web page, may be defeated by key loggers taking screen shots at each mouse click, which may enable the reconstruction of the graphically entered information.

SUMMARY

An applet may be downloaded or provided to a web browser when a user visits a site in order to protect data input by the user from being captured by malicious software, such as key loggers. The applet may present a user input field in the web browser and may generate a random sequence of low-level key stroke or mouse click events within the input field when the user enters information, such as a username and/or password. A listening key logger will receive a large amount of random data, whereas the applet will receive and buffer only the actual user data that may be communicated to a remote site accessed by the user.

In an implementation, user-input data received in an input field in a user interface may be protected by executing an applet within the user interface and generating random data associated with the input field. The random data and the input data may be provided to a client device in which the applet is executing, while only the input data is communicated to the remote computing device.

In an implementation, electronic transactions between a client device and a remote server over a network connection are protected. A user input area is presented in a user interface, and when a focus event is received in the user input area, random data is generated that is associated with a type of user input area. User input data is received within the user input area and the random data and user input data are queued in the input buffer of a computing device. However, only the user input is communicated to the remote server.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
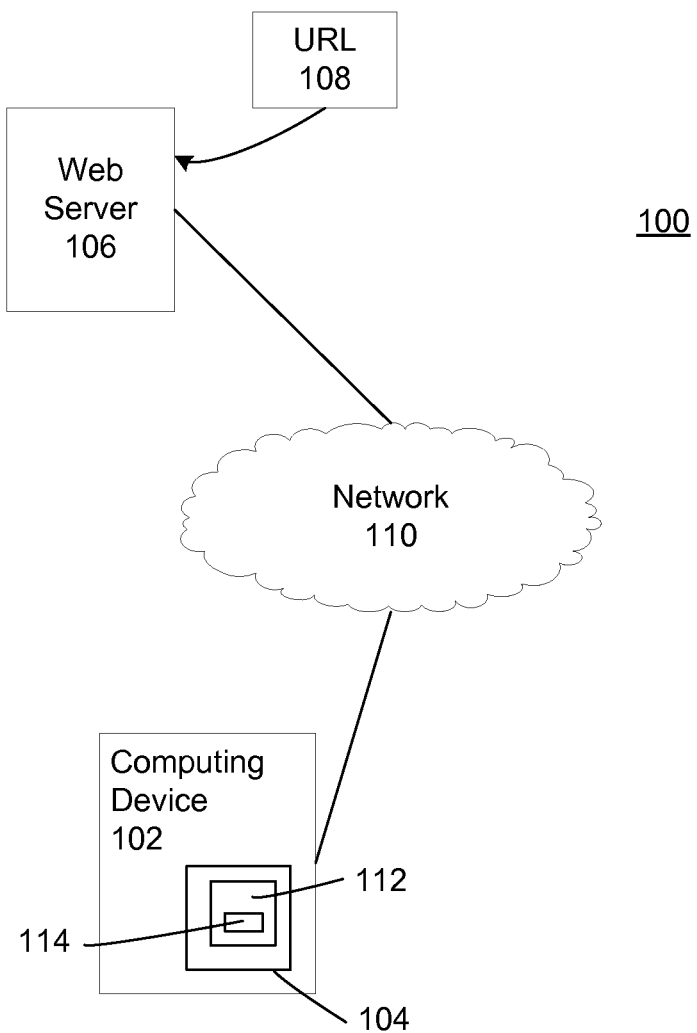
FIG. 1 illustrates an exemplary environment.

FIG. 1 illustrates an exemplary environment 100 that includes a computing device 102 and a web server 106 that may communicate over a network 110. The computing device 102 may be a personal computer, handheld device, a network enabled device, a gaming device, a mobile telephone or the like. Details of an exemplary computing device are described in FIG. 6. A user may interact with the web server 106 using a web browser 104 running on the computing device 102 to make financial transactions, on-line purchases, read e-mail, access a corporate infrastructure, or access a home network. For example, if the user wishes to make a financial transaction, the user may launch the web browser 104 and enter or retrieve a Uniform Resource Locator (URL) 108 of a web page of the financial institution. The web browser 104 may comprise any conventional web browser, such as Internet Explorer, Firefox, Opera or Safari.

The web browser 104 retrieves a web page 112 from the web server 106 identified by the URL 108, and displays the web page 112 on a screen (not shown) of the computing device 102. For a user to access or perform transactions with, e.g., the financial institution, the user may enter a registered account username and password into an appropriate field(s)

114 on the web page 112 in the web browser 104. The user may click a submit or "OK" key, or press enter on a keyboard to prompt the web browser 104 to transmit this information to the web server 106.

During the session with the web server 106, the user may enter many types of information in addition to a username and password, such as account numbers, buy or sell orders, transfer instructions, or credit card information that is transmitted to and from the web server 106 typically over a secure sockets connection (i.e., Secure HyperText Transfer Protocol (HTTPS)). When the user has completed his or her session, the user may log off and close the web browser 104.

If during the interaction with the web server 106, a key logger was running on the computing device 102, information entered by the user into the field(s) 114 on the web page 112 may be captured and retrieved at a later time for malicious purposes. This could result in fraudulent use of the information, identity theft, and defrauding of the service, merchant or institution that provides services through the web server 106.

In some implementations, to prevent a key logger from obtaining sensitive information, an applet may be loaded by the web browser 104 when the user accesses the web server 106. The applet may generate a random sequence of low-level keystroke events when executing within a field 114 that provides a large volume of random keystrokes to a key logger that may be running on the computing device 102. By providing a relatively large volume of keystroke events, the individual or entity that installed the key logger would have great difficulty determining real data input by the user from random data generated by the applet.

The applet may be a Java applet or ActiveX control that is loaded by the web browser 104. The built-in security features of Java applets ensure that an applet can only directly communicate with the web server from which it originated. The applet may be programmed to receive and buffer the keystrokes and/or mouse clicks that are actually entered by the user, while an input buffer on the computing device 102 would receive all input events, including the random events generated by the applet. As such, a key logger capturing input events would receive a large volume of data, while the web server 106 would only receive the user's actual keystrokes and/or mouse clicks.

The applet may provide an entry field on the web page 112 as the field 114 after it executes within the web page 112. The applet may be programmed to randomly generate a combination of numbers, letters or extended characters as if they were entered into the field 114. In some implementations, the applet may be programmed to enter random information in accordance with the type of field 114. For example, if the field 114 is an entry field for a Social Security number, then the random information may only be numeric information. If the field 114 is a birth date field, then the applet may be programmed to provide random data that appears to be a feasible date of birth. In some implementations, the applet may be programmed such that the frequency at which random data is generated appears to be, or is similar to, the frequency at which the user would type data into the field 114. Thus, it would appear to the key logger that a human is entering the data into the field 114.

In some implementations, the applet may use the java.awt.robot class to automatically provide input events to the input field 114 in the web browser 104. The java.awt.robot class may be used to generate native system input events for test automation, self-running demos, and other applications where control of the mouse and keyboard is needed. The events appear as native events, thus they appear as if they are actually coming from the mouse or keyboard connected to the computing device 102 and are not detectable to the key logger as being generated by a software application. In some implementations, the applet is not cached and is reload it each time the user accesses the web server 106 using the web browser 104.

In some implementations, JavaScript may be used in combination with the Java applet. For example, when an on Focus event occurs, such as when a user clicks into the field 114, the Java applet may begin randomly generating keystroke sequences. When the focus moves to another field, the Java applet would stop randomly generating keystroke sequences.

Figure 2:
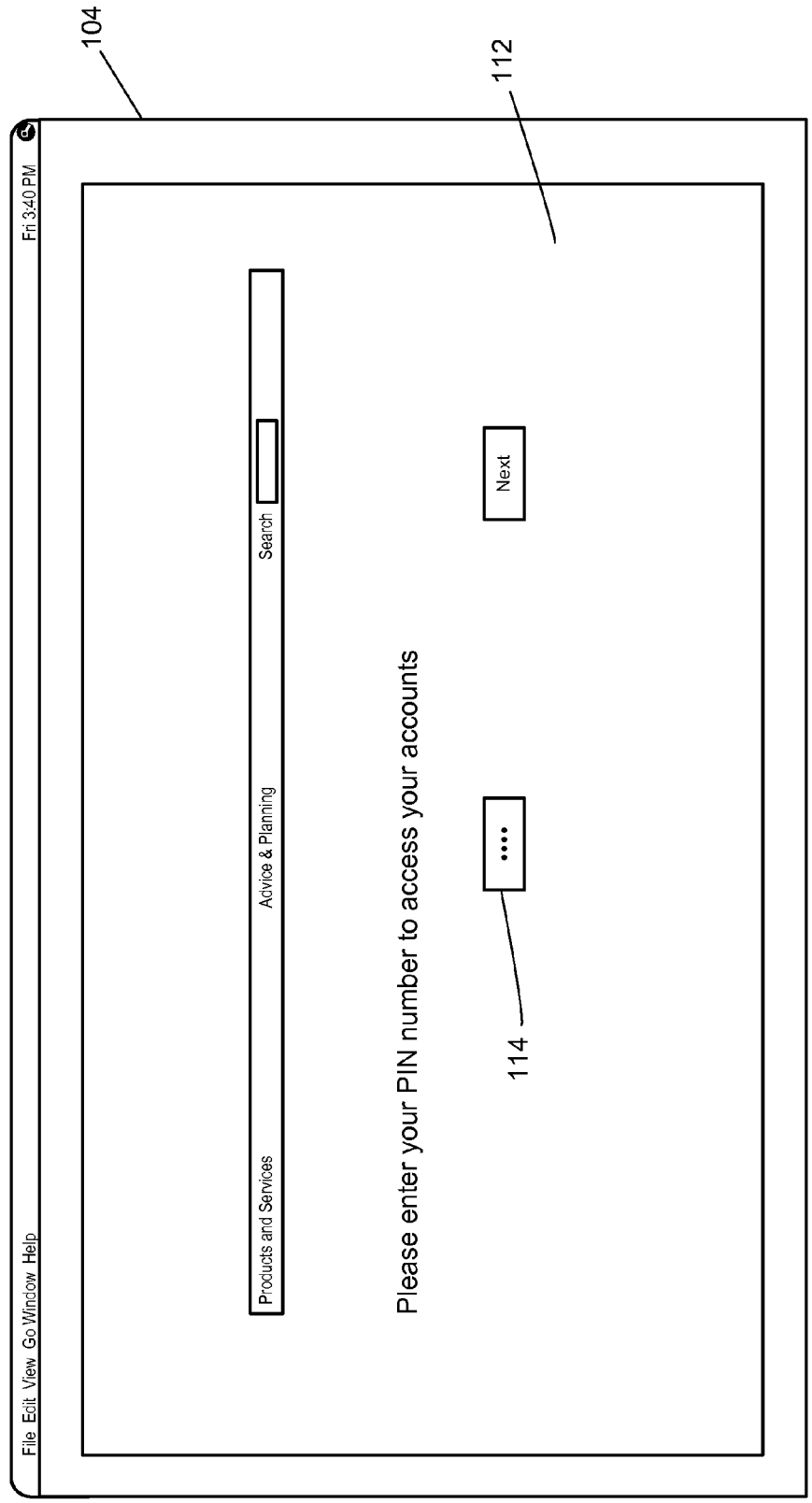
FIG. 2 illustrates an exemplary web page displayed within the web browser.

FIG. 2 illustrates an exemplary web page 112 displayed within the web browser 104. As shown, the field 114 is provided for user to enter a PIN number. When the user clicks into the field 114 to enter his/her PIN, the applet begins to generate random data. When the user clicks "NEXT," the applet stops generating random data and sends what data was actually entered by the user (i.e., the PIN number) to the web server 106. As such, the web server 106 receives an appropriate number of characters for the field 114, whereas the key logger receives a large amount of random data. In the example of FIG. 2, the user entered "7777" as the PIN number. In some implementations, however, the PIN number may not be displayed, rather a representation (e.g., a "*" or "•") is echoed in the field 114 for security purposes.

In some implementations, the field 114 may be a graphical keypad or other graphical input mechanism to allow a user to enter a PIN number or other identifying information by clicking the mouse on the keypad or graphic to enter the identifying information. For example, the user may click on numbers displayed on the keypad to enter the PIN, or the user may click on a sequence of graphics only known to the user. The sequence of graphics may be, for example, a bird, a squirrel, a horse and a dog, which would then be correlated as the user's unique identification sequence.

Figure 3:
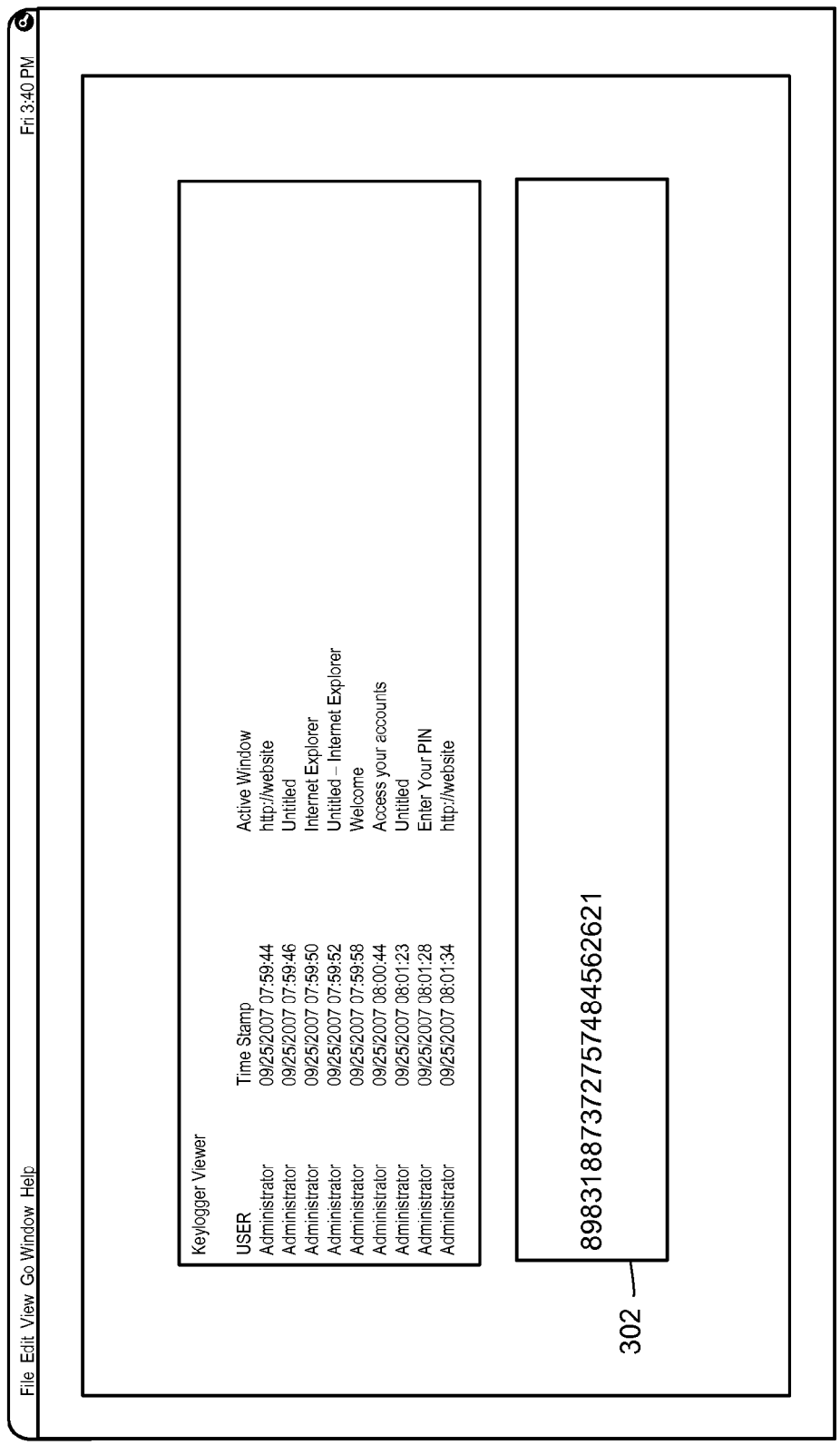
FIG. 3 illustrates a screen shot of exemplary data captured by a key logger.

FIG. 3 illustrates a screen shot 300 of data captured by a key logger. As shown in the screen shot 300, a large volume of data 302 was generated by the applet when the user entered the pin number in the field 114. As can be seen in the data 302, the pin number values ("7777") are in the data stream received by the key logger. However, because of the large amount data generated by the applet, an individual or entity that installed the key logger will have difficulty discriminating the user-entered data from the randomly generated data.

In some implementations, the key logger data may include the click patterns of the user and/or screen shots to visually identify the user's input sequence using a mouse. The visual sequence may be used to recreate the user's actions to gain authorized access to the user's account.

Figure 4:
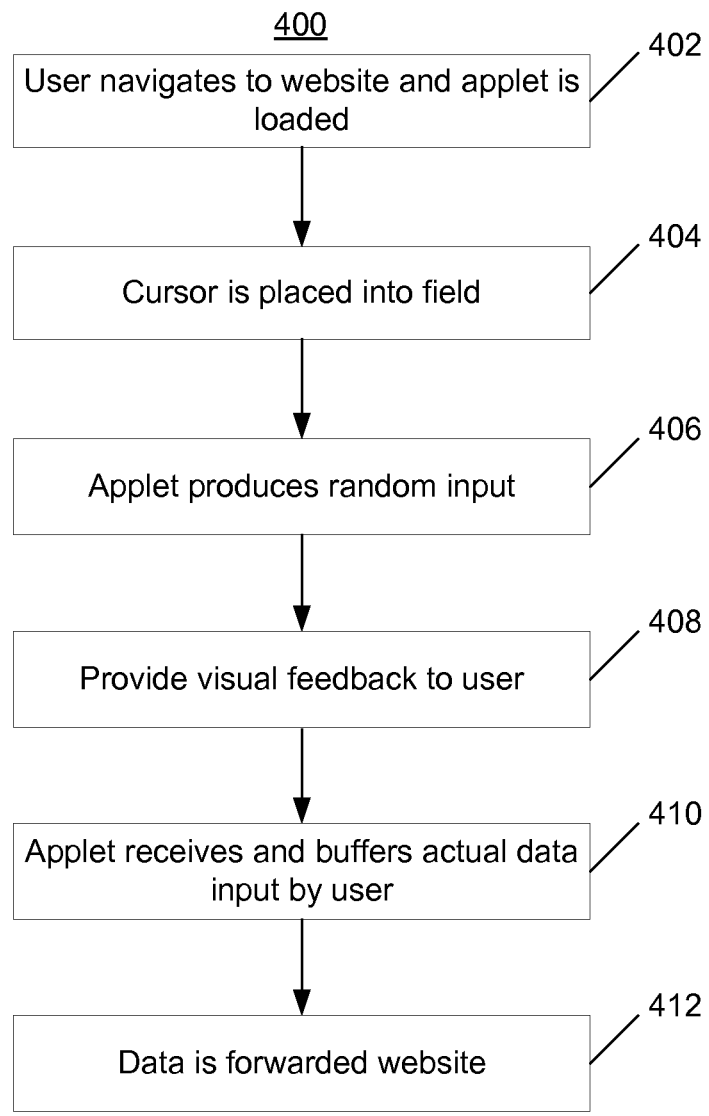
FIG. 4 illustrates an operational flow of an implementation of a method that may be used to provide random keystrokes.

FIG. 4 illustrates an operational flow 400 of an implementation of a method that may be used to provide random keystrokes and/or mouse clicks. At 402, the user navigates to a website and the random keystroke and/or mouse click applet is loaded. For example, the user may enter the URL 108 of the web server 106 and the applet may be downloaded to the web browser 104 running on the computing device 102. At 404, the cursor is placed into the field. For example, the user may change the focus of the web page 112 to an entry field by clicking in the field 114.

At 406, the applet produces random input data. For example, the applet may begin generating random keystrokes and/or mouse clicks. At 408, visual feedback is provided to the user. For example, the user may enter data into the field 114 and the data is echoed back on the web page 112 or some representation of the data (e.g., a "*" or a "•") is displayed. The entered data is inserted into the random keystroke/mouse click data stream generated by the applet at 406.

At 410, the applet receives the actual data input by the user. For example, the applet may receive and buffer the input data from the field 114 so it may be communicated to the web server 106. At 412, the user input data is forwarded to the website. For example, in FIGS. 2 and 3, only 7777 (i.e., the user-entered data) is communicated to the Web server 106.

The operational flow 400 may also be used to randomize graphical input. For example, at 406, random information may be provided to a display or screen buffer such that screenshots captured by the key logger contain random information. However, the visual feedback at 408 may represent the actual graphical information entered or clicked by the user.

In some implementations, the applet may reside on a hardware device that is inserted into the computing device 102 in order to provide random keystrokes and/or mouse clicks. For example, a USB device may be plugged into the computing device 102. The USB device may contain the applet, and appear to the computing device 102 as a keyboard and/or mouse. Thus, a key logger would be unable to distinguish between the USB device and keyboard and/or mouse of the computing device 102.

Figure 5:
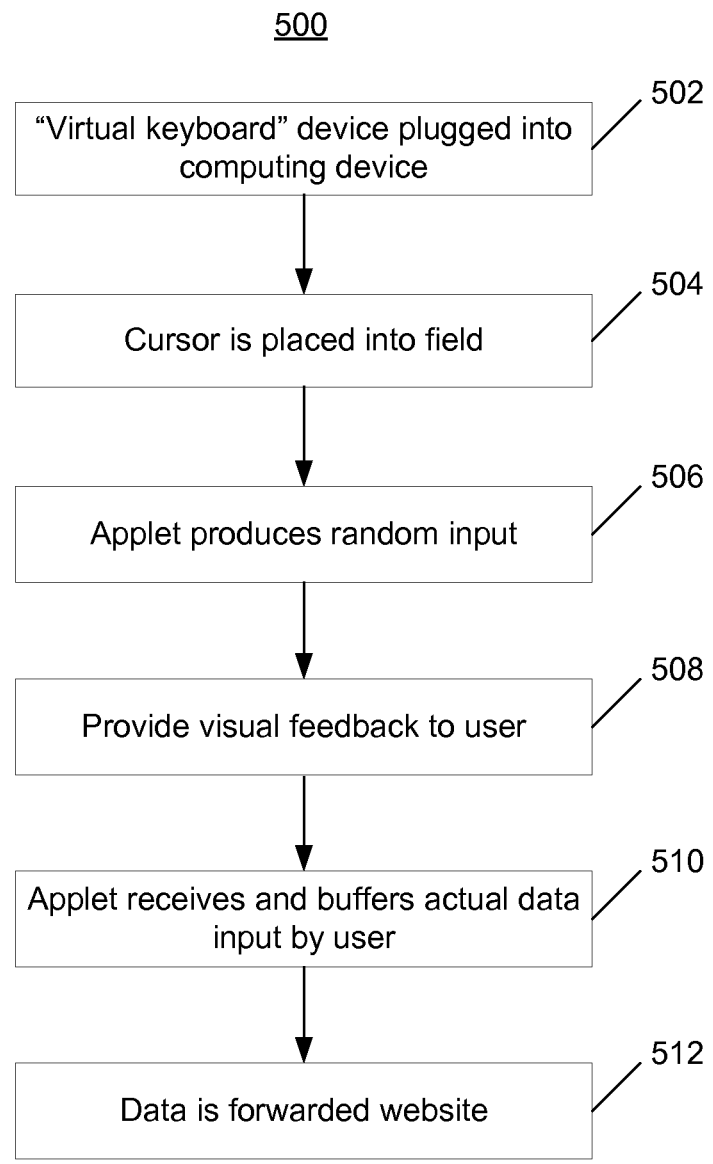
FIG. 5 illustrates an operational flow of an implementation of a method that may be used to provide random keystrokes using a hardware device.

FIG. 5 illustrates an operational flow 500 of an implementation of a method that may be used to provide random keystrokes and/or mouse clicks using a hardware device. At 502, the user inserts the "virtual keyboard" device into the computing device. For example, the user may plug in a USB device or other removable device that appears to the computing device 102 as a keyboard and/or mouse. The device would also contain the applet that may be loaded when the device is inserted. In FIG. 5, 504-512 may be performed in substantially same manner as 404-412 described above with regard to FIG. 4 to provide random keystrokes or mouse clicks to a listening key logger, while only providing the user-entered information to the web server 106.

Exemplary Computing Arrangement

Figure 6:
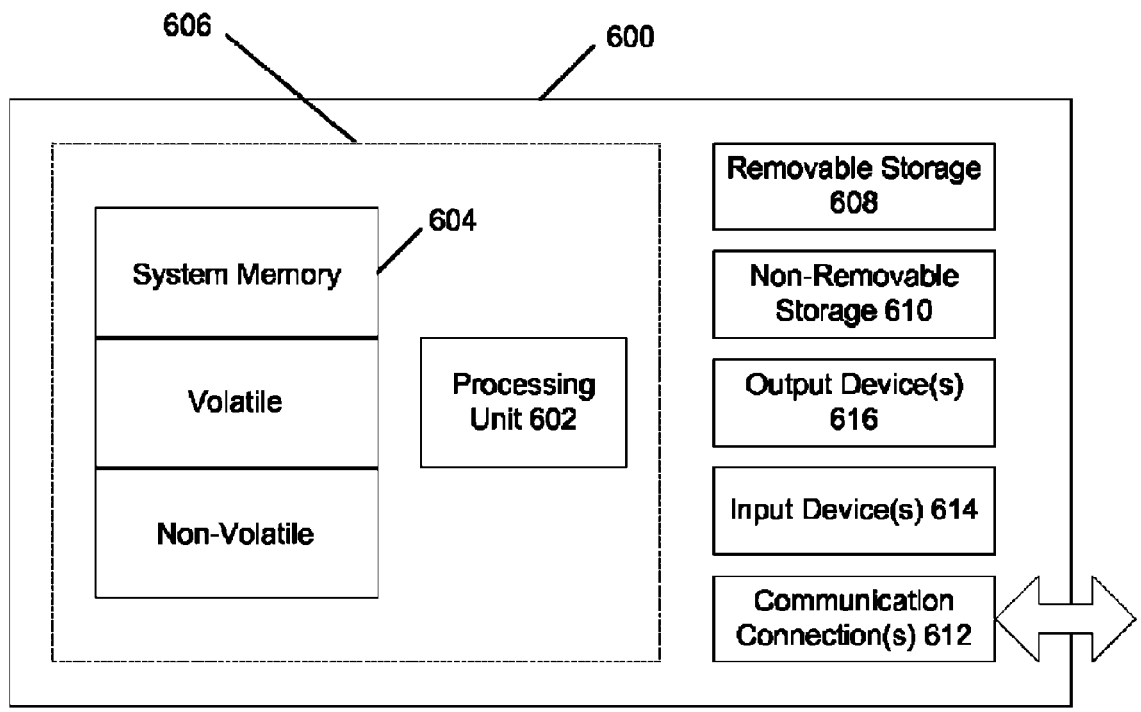
FIG. 6 is a block diagram of an example computing environment in which example aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of obfuscating data received in a user interface by loading an applet within the user interface, the method performed by the applet and comprising:
   receiving first input data in an input field of a first type from a user in real time;
   receiving second input data in an input field of a second type, different from the first type, from the user in real time, wherein the first type and the second type are selected from the group including a social security number field, a birthdate field, a credit card number field, a phone number field, and an address field;
   generating first additional data associated with the first input data while the first input data is being input in the input field of the first type, wherein the first additional data is generated in the format of the first input field and at an expected frequency associated with a user inputting the first input data in the input field of the first type;
   presenting the first input data to a remote server for processing a user transaction;
   combining the first input data and the first additional data to form a first plurality of input events and presenting the first plurality of input events to an operating system;
   generating second additional data associated with the second input data while the second input data is being input in the input field of the second type, wherein the second additional data is generated in the format of the second input field and at an expected frequency associated with a user inputting the second input data in the input field of the second type;
   presenting the second input data to the remote server for processing the user transaction; and
   combining the second input data and the second additional data to form a second plurality of input events and presenting the second plurality of input events to the operating system.

2. The method of claim 1, further comprising presenting the user interface within a web browser directed to the remote server identified by an address to which the input field of the first type and the input field of the second type communicate.

3. The method of claim 2, further comprising communicating the first input data and second input data to the remote server at the address without the first additional data and the second additional data.

4. The method of claim 1, further comprising:
   generating numeric data for the input field of the first type in response to determining, that the input field of the first type receives numeric input data; and
   generating alphanumeric data for the input field of the second type in response to determining that the input field of the second type receives alphanumeric input data.

5. The method of claim 1, further comprising:
   generating additional input for a graphical input associated with the user interface;
   receiving user-initiated graphical inputs on the user interface; and
   presenting the user-initiated graphical inputs on a display.

6. A non-transitory computer-readable medium encoded with computer-readable instructions for obfuscating data received in a user interface by loading an applet within the user interface, said computer-readable instructions comprising instructions that:
   receive first input data in an input field of a first type from a user in real time;
   receive second input data in an input field of a second type, different from the first type, from the user in real time, wherein the first type and the second type are selected from the group including a social security number field, a birthdate field, a credit card number field, a phone number field, and an address field;
   generate first additional data associated with the first input data while the first input data is being input in the input field of the first type, wherein the first additional data is generated in the format of the first input field and at an expected frequency associated with a user inputting the first input data in the input field of the first type;
   present the first input data to a remote server for processing a user transaction;
   combine the first input data and the first additional data to harm a first plurality of input events and present the first plurality of input events to an operating system;
   generate second additional data associated with the second input data while the second input data is being input in the input field of the second type, wherein the second additional data is generated in the format of the second input field and at an expected frequency associated with a user inputting the second input data in the input field of the second type;

present the second input data to the remote server for processing the user transaction; and combine the second input data and the second additional data to harm a second plurality of input events and presenting the second plurality of input events to the operating system.

7. The computer-readable medium of claim 6, further comprising instructions that:

present the user interface within a web browser directed to the remote server identified by an address to which the input field of the first type and the input field of the second type communicate.

8. The computer-readable medium of claim 7, further comprising instructions that communicate the first input data and second input data to the remote server at the address without the first additional data and the second additional data.

9. The computer-readable medium of claim 6, further comprising instructions that:

generate numeric data for the input field of the first type in response to determining that the input field of the first type receives numeric input data; and generate alphanumeric data for the input field of the second type in response to determining that the input field of the second type receives alphanumeric input data.

10. The computer-readable medium of claim 6, further comprising instructions that:

generate additional input for a graphical input associated with the user interface;

receive user-initiated graphical inputs on the user interface; and present the user-initiated graphical inputs on a display.

11. A system for obfuscating data received in a user interface by loading an applet within the user interface, comprising:

at least one subsystem that receives first input data in an input field of a first type from a user in real time;

at least one subsystem that receives second input data in an input field of a second type, different from the first type, from the user in real time, wherein the first type and the second type are selected from the group including a social security number field, a birthdate field, a credit card number field, a phone number field, and an address field;

at least one subsystem that generates first additional data associated with the first input data while the first input data is being input in the input field of the first type, wherein the first additional data is generated in the format of the first input field and at an expected frequency associated with a user inputting the first input data in the input field of the first type;

at least one subsystem that presents the first input data to a remote server for processing a user transaction;

at least one subsystem that combines the first input data and the first additional data to form a first plurality of input events and presenting the first plurality of input events to an operating system;

at least one subsystem that generates second additional data associated with the second input data while the second input data is being input in the input field of the second type, wherein the second additional data is generated in the format of the second input field and at an expected frequency associated with a user inputting the second input data in the input field of the second type;

at least one subsystem that presents the second input data to the remote server for processing the user transaction; and at least one subsystem that combines the second input data and the second additional data to form a second plurality of input events and presenting the second plurality of input events to the operating system.

12. The system of claim 11, wherein the user interface is presented within a web browser directed at the remote server identified by an address to which the input field of the first type and the input field of the second type communicate.

13. The system of claim 12, wherein the first input data and second input data are communicated to the remote server at the address without the first additional data and the second additional data.

14. The system of claim 11, wherein numeric data is generated for the input field of the first type in response to determining that the input field of the first type receives numeric input data, and wherein alphanumeric data is generated for the input field of the second type in response to determining that the input field of the second type receives alphanumeric input data.

15. The system of claim 11, wherein the at least one subsystem that loads the applet generates additional input for as graphical input associated with the user interface, receives user initiated graphical inputs on the user interface, and presents the user-initiated graphical inputs on a display.

* * * * *